(12) United States Patent
Surles

(10) Patent No.: US 6,177,484 B1
(45) Date of Patent: Jan. 23, 2001

(54) COMBINATION CATALYST/COUPLING AGENT FOR FURAN RESIN

(75) Inventor: Billy W. Surles, Houston, TX (US)

(73) Assignee: Texaco Inc., White Plains, NY (US)

( * ) Notice: Under 35 U.S.C. 154(b), the term of this patent shall be extended for 0 days.

(21) Appl. No.: 09/185,363

(22) Filed: Nov. 3, 1998

Related U.S. Application Data

(60) Provisional application No. 60/064,052, filed on Nov. 3, 1997.

(51) Int. Cl.$^7$ .................................................. C09K 7/00
(52) U.S. Cl. .......................................... 523/131; 524/315
(58) Field of Search .............................. 524/315; 523/131

(56) References Cited

U.S. PATENT DOCUMENTS

| | | | |
|---|---|---|---|
| 3,993,117 | * 11/1976 | Chevriot | 164/43 |
| 4,042,032 | 8/1977 | Anderson et al. | 166/276 |
| 4,427,069 | 1/1984 | Friedman | 166/295 |
| 4,699,543 | 10/1987 | Mio et al. | 404/109 |
| 4,800,960 | 1/1989 | Friedman et al. | 166/276 |
| 4,817,720 | 4/1989 | Friedman et al. | 166/295 |
| 4,842,072 | 6/1989 | Friedman et al. | 166/295 |
| 4,895,207 | 1/1990 | Friedman et al. | 166/276 |
| 4,898,750 | 2/1990 | Friedman et al. | 427/221 |
| 4,903,770 | 2/1990 | Friedman et al. | 166/288 |
| 4,938,287 | 7/1990 | Friedman et al. | 166/288 |
| 4,964,465 | 10/1990 | Surles | 166/295 |
| 5,005,647 | 4/1991 | Friedman et al. | 166/295 |
| 5,005,648 | 4/1991 | Friedman et al. | 166/295 |
| 5,010,953 | 4/1991 | Friedman et al. | 166/288 |
| 5,040,604 | 8/1991 | Friedman et al. | 166/295 |
| 5,159,980 | 11/1992 | Onan et al. | 166/294 |
| 5,199,490 | 4/1993 | Surles et al. | 166/270 |
| 5,199,492 | 4/1993 | Surles et al. | 166/295 |
| 5,284,206 | 2/1994 | Surles et al. | 166/270 |
| 5,285,849 | 2/1994 | Surles et al. | 166/295 |
| 5,293,939 | 3/1994 | Surles et al. | 166/295 |
| 5,377,759 | 1/1995 | Surles | 166/295 |
| 5,423,381 | 6/1995 | Surles et al. | 166/295 |
| 5,520,251 | 5/1996 | Surles et al. | 166/307 |
| 5,551,513 | 9/1996 | Surles et al. | 166/278 |
| 5,567,088 | 10/1996 | Shotts et al. | 405/270 |

OTHER PUBLICATIONS

Furan Derivatives, Encyclopedia of Chemical Technology, Third Edition, vol. 11, pp. 510–516.

* cited by examiner

*Primary Examiner*—Paul R. Michl
(74) *Attorney, Agent, or Firm*—Morris N. Reinisch; Howrey Simon Arnold & White

(57) ABSTRACT

A polymerizable resin composition useful in downhole applications in a subterranean well is disclosed as including a furfuryl alcohol oligomer resin and a polymerization catalyst. The catalyst should be a $C_9$ to $C_{15}$ alkyl benzene sulfonic acid and preferably is a dodecyl benzene sulfonic acid. The polymerizable resin composition may also include an organic diluent selected from $C_3$ to $C_8$ alkyl esters, $C_1$ to $C_6$ alkyl alcohols; halogenated aromatics and mixtures thereof. Preferably the organic diluent is a $C_1$ to $C_6$ alkyl acetate and more preferably the organic diluent is butyl acetate. The polymerizable resin composition may include super-slurper polymers such as copolymers of starch and acrylamides or starch and acrylates. Solid particles may also be included in the polymerizable resin composition. In one embodiment in which the solid particles are sand a consolidated mass of sand particles forms, the consolidated mass having a compressive strength that is at least 50% greater than a similar consolidated mass made using p-toluene sulfonic acid as the polymerization catalyst. At least partial polymerization of the resin occurs at a temperature from about 15° C. (60 F.°) to about 260° C. (500 F.°).

18 Claims, No Drawings

COMBINATION CATALYST/COUPLING AGENT FOR FURAN RESIN

This application claims priority of U.S. Provisional Patent Application No.: 60/064,052 filed on Nov. 3, 1997.

FIELD OF THE INVENTION

The present invention is generally directed to a polymerizable resin composition useful in forming a consolidated mass and methods of using the polymerizable resin composition downhole in wells.

BACKGROUND

The production of petroleum or natural gas requires a well that penetrates at least one petroleum or gas containing subterranean formation. In doing so, it is not unusual for such wells to penetrate one or more petroleum or gas containing subterranean formations which also contain unconsolidated mineral particles, such as sand or gravel. The removal of petroleum, gas, water and other production fluids from such a formation during the production process may cause the unconsolidated mineral particles to enter the well along with the production fluids. Such occurrences often lead to a number of difficult and expensive problems.

One problem encountered in some circumstance is that a well will "sand up", that is to say, the downhole portion of the well fills with sand. Because the downhole portion of the well is sanded-up, further production of fluid from the formation becomes difficult or impossible. Another problem that may be encountered is when sand is produced along with the production fluid. The continuous inclusion of sand in the production fluid causes accelerated wear in the pumps and associated mechanisms utilized during the pumping of the production fluids from the well due to the abrasive affect of the mineral particles. Yet another problem that may be encountered in such wells is the gradual removal of mineral particles from the formation around the downhole well area during the pumping of production fluid. Over time this gradual removal of mineral particles causes a cavity to form in the subterranean formation which eventually collapses destroying the well.

The above noted problems and others caused by the inclusion of mineral particles in production fluids should be well known to one skilled in the art. Methods have been devised and applied to petroleum wells in order to reduce or eliminate the production of mineral particles during the course of petroleum production. Such methods include the use of downhole particle screens and filters, gravel packing methods and treatment of the formation with various polymerizable resin compositions which consolidate the mineral particles into a fluid permeable mass.

In addition to the problems resulting from the production of naturally occurring mineral particles, it is sometimes desired to fracture the subterranean formation to increase the volume of production from the well. Hydraulic fracturing of the subterranean formation takes place when hydraulic pressure applied from the surface, causes the formation to crack or fracture. In order to keep the fracture open, propant materials such as sand, glass beads, ceramics, polymer beads and other such materials known in the art are pumped into the open fractures. Upon the start of production, propant material may be dislodged due to the flow of production fluids. The inclusion of propant materials in the production fluids act in a similar manner as naturally occurring sand. That is to say the presence of propant material in the production fluids results in the premature wear of the down hole pump and other components and can result in the "sanding in" of the well.

Another area of concern encountered during petroleum production occurs when a well is in fluid communication with a subterranean formation that includes one or more petroleum producing formations and one or more water producing formations. Production of petroleum from such a well can result in the production of both water and petroleum. Because the viscosity of petroleum is typically higher than water, a large volume of water may be produced along with the petroleum. The amount of water contained in the production fluids often referred to as the "water-cut." Wells with a high water-cut are difficult and expensive to operate because a substantial amount of the production volume lost due to the presence of water. In addition, processes for separating the petroleum from the water and disposal of the water in an environmentally sound manner must be carried out on the surface which increases both capital and operating costs. Thus it is desirable to minimize the water-cut in the production fluid pumped to the surface by controlling the flow of water into the well from the water producing formations. Methods which have been developed to accomplish this goal include downhole separation techniques and methods of controlling the water flow by sealing off the source of water with a thermoplastic resin as well as other methods which should be known to one skilled in the art.

Yet a third problem encountered by the petroleum industry occurs when an unproductive well is to be abandoned. Before abandonment, a well needs to be effectively and permanently plugged to prevent the migration fluids from one or more subterranean formation to another subterranean formation. The plugging of a petroleum well is especially important because the well may penetrate formations containing fresh water that may be used for drinking or other purposes. The long term durability and compressive strength of the materials used to plug wells in preparation for abandonment is of great concern because of the potential for the contamination of the fresh water formation by salt water or petroleum formations which the well may also penetrate. One method of preventing such migrations is to plug the well with a thermoplastic resin. Typically such plugs include materials to prevent shrinkage or fillers to minimize the amount of thermoplastic resin that is used. If the plug is to be long lasting, it should be able to withstand the conditions encountered downhole for long periods of time.

One manner of overcoming the above problems is to use thermosetting resins to consolidate the unconsolidated mineral particles or to control the production of water from an intervening formation or to permanently plug a well prior to abandonment. One of the more successful thermosetting resins used for these purposes is furfuryl alcohol oligomer resin. Furfuryl alcohol oligomer resin is readily polymerized to form a polymer that is durable in the presence of high temperatures and caustic substances. Initiation of the polymerization reaction of furfuryl alcohol oligomer resin is temperature dependent and the reaction requires the presence of an acid catalyst. However, care needs to be taken when using such furfuryl alcohol resins in subterranean wells for these purposes due to the rapid exothermic nature of the polymerization reaction. It has been reported in the art that uncontrolled polymerization reactions of furfuryl alcohol resin in petroleum wells has generated enough heat to cause the subsurface explosion of the well.

In a relevant U.S. Pat. No. 5,285,849 and others noted therein, toluene sulfonic acid is disclosed as being a useful catalyst that gives a controlled autopolymerization reaction. Despite the success of this furfuryl alcohol oligomer resin system, laboratory testing and field use have identified aspects which need improvement:

1. At formation temperatures below 49° C. (120 F.°), and at formation temperatures above (270 F.°), the polymerization time for furfuryl alcohol oligomer resin becomes unpredictable using toluene sulfonic acid as the catalyst. As a result of this unpredictability, a loss in production time occurs.
2. The inclusion of a super-slurper polymer to prevent shrinkage or expansion of the cured resin or the inclusion of filler materials to increase volume of a plug material causes unpredictable and excessively long curing times when toluene sulfonic acid is used as the polymerization catalyst.
3. Due to the downhole environment, increased adhesion of the cured furfuryl resin to the surface of the mineral particles is desired. An increase in particle adhesion is readily reflected by an increase the compressive strength and results in an increase in the durability of the consolidated particle mass.

SUMMARY OF THE INVENTION

The present invention is generally directed to a polymerizable resin composition including a furfuryl alcohol oligomer resin and a polymerization catalyst which is a $C_9$ to $C_{15}$ alkyl benzene sulfonic acid. In one embodiment the preferred polymerization catalyst is dodecylbenzene sulfonic acid. The resin composition may further include an organic diluent selected from the group including $C_3$ to $C_8$ alkyl esters, $C_1$ to $C_6$ alkyl alcohols, halogenated aromatics and mixtures thereof. In one embodiment the preferred organic diluent is a $C_1$ to $C_6$ alkyl acetate, more specifically butyl acetate. The polymerizable resin composition may further include super-slurper polymers or solid particles. The former include copolymers of starch and acrylamides or starch and acrylates, while the latter may be selected from the group including sand silica, gravel, glass beads, barite coconut shell or hull, wood chips, wood saw dust and mixtures thereof. When utilized downhole to consolidate mineral particles, in particular sand, the polymerizable resin composition undergoes at least partial polymerization and forms a consolidated mass of sand particles which has a compressive strength that is at least 50% greater than a similar consolidated mass made using previously disclosed polymerization catalysts. In one embodiment, the consolidated mass is at least partially permeable to fluids. The formulation of the polymerizable resin composition is such that at least partial polymerization occurs at a temperature from about 15° C. (60 F.°) to about 260° C. (500° F.). The time required to achieve at least partial polymerization has been found to depend upon both the polymerization temperature and the amount of catalyst within the polymerizable resin composition. In one embodiment the polymerizable resin composition includes from about 40 to about 90 weight percent furfuryl alcohol oligomer resin, from about 5 to about 60 weight percent organic diluent and about 0.01 to about 5 weight percent polymerization catalyst.

The polymerizable resin compositions of the present invention may be used downhole in a petroleum well to prevent the sanding-up of the well or the inclusion of mineral particles with the production fluids. In such cases the polymerizable resin composition is injected into the petroleum formation followed by a post-flushing of aqueous salt solution so as to create micro-channels. Upon at least partial polymerization, a consolidated mass is formed downhole around the well that is at least partially permeable to fluids.

The resin compositions of the present invention may also be used in a method to control the flow of water from subterranean formations into the well. In such cases the polymerizable resin composition is injected in the water producing formation and allowed to at least partially polymerize. In doing so, the well is effectively isolated from the water producing subterranean formation thus preventing the inadvertent production of water.

In yet another method of using the polymerizable resin compositions of the present invention, the resin compositions are utilized to effectively seal a well prior to abandonment. In such embodiments, a resin composition is introduced into the well and allowed to at least partially polymerize so as to effectively seal the well bore. In some cases super-slurper polymers are included in the resin composition to prevent the shrinkage or expansion of the plug upon full polymerization or upon changes in the environmental conditions encountered by the downhole plug. A filler material may also be used to increase the volume to the resin composition used to form the downhole plug. Examples of filler materials include gravel, rocks, coconut shell or hull, wood chips, wood saw dust and mixtures thereof.

An important aspect of the present invention is that the time required for the resin composition to at least partially polymerize is predictable and depends upon the curing temperature and the amount of polymerization catalyst present in the resin composition. Unlike previously utilized polymerization catalysts, the catalysts utilized in present invention is not adversely affected by the presence or absence of super-slurper polymers or filler materials that may be mixed with the resin composition. In addition, the curing time for the resin compositions disclosed herein remain predictable temperatures from about 15° C. (60° F.) to about 260° C. (500° F.).

DESCRIPTION OF ILLUSTRATIVE EMBODIMENTS

The present invention is an improvement over the resin systems used or disclosed in U.S. Pat. Nos. 4,427,069; 4,669,543; 4,800,960; 4,842,072; 4,938,287; 5,010,953; 5,199,490; 5,199,492; 5,284,206; 5,285,849; 5,293,939; 5,423,381; 5,377,759; and, 5,551,513, the contents of which are hereby incorporated by reference herein in their entirety.

One aspect of the present invention is a polymerizable resin composition including a polymerizable resin material and a catalyst, the catalyst being a $C_9$ to $C_{15}$ alkyl benzene sulfonic acid. The compositions of the present invention are particularly advantageous for use in subterranean formations in which the temperature is from about 15° C. (60° F.) to about 260° C. (500° F.).

Any acid catalyzed, polymerizable resinous material which can be used to coat particles, and then be suspended in the carrier fluid for introduction into the well bore can be used in our invention. Examples of such resins include furan resins, furfuryl alcohol resins, phenol resins and other thermoplastic resins that polymerize via a condensation reaction. A particularly preferred polymerizable resin material is furfuryl alcohol oligomer resin, herein referred to generally as furfuryl alcohol resin. Furfuryl alcohol resins are readily available from a number of commercial sources. One skilled in the art should know that furfuryl alcohol resins are relatively inexpensive polymerizable resins which auto-polymerize upon mixture with acid catalyst and the application of heat. Upon curing, the resulting furfuryl alcohol polymers form an insoluble mass that is highly resistant to chemical attack and thermal degradation. Commercially obtained furfuryl alcohol resin ordinarily contains about 90 to about 95 percent furfuryl alcohol examples of which include "QUACOR 1300 FURAN RESIN" TM marketed by Q.O. Chemical or EX18663 resin made by Acme Resin Corporation. The amount of furfuryl alcohol resin may be from about 40 to about 90 percent by weight of the composition.

The furfuryl alcohol resin utilized in the present invention is viscous so in order to permit it to be introduced into the wellbore, pumped downhole and into the subterranean formation, it is desirable to reduce viscosity by the addition of a suitable organic diluent. In addition to reducing viscosity, the role of the organic diluent may be to accomplish a relatively complete filling of any void spaces in the formation or to add density to the polymerizable resin composition. Suitable organic diluents may be any organic liquid that is soluble in the furfuryl alcohol resin and does not accelerate, slow down, inhibit or have other adverse affects on the polymerization reaction. In one embodiment the organic diluent is selected from the group including $C_3$ to $C_8$ alkyl esters, $C_1$ to $C_6$ alkyl alcohols; halogenated aromatics and mixtures thereof. In another embodiment the organic diluent is a $C_1$ to $C_6$ alkyl acetate. The utilization of a hydrolyzable alkyl acetate as the organic diluent is preferred since the hydrolysis of the alkyl acetate increases the extent of polymerization of the furfuryl alcohol resin as is described below. And in yet a third embodiment the organic diluent is butyl acetate. In situations in which the density of the polymerizable resin composition needs to be increased, a mixture of organic diluents is used that includes halogenated aromatics. In one such embodiment, a mixture of alkyl acetate and bromobenzene is used, however other high density halogenated aromatics may be used. When the organic diluent is included in the polymerizable resin compositions disclosed herein, the amount may be from 5 to 60 percent by weight of the composition.

As noted above, both an acid catalyst and heat is needed to polymerize the furfuryl alcohol resin. Suitable catalysts should preferably be soluble in furfuryl alcohol resin and capable of catalyzing the auto-polymerization reaction without other chemical initiators. However, the catalyst must not be too active and cause the premature curing of the furfuryl alcohol resin during mixing on the surface, introducing into the wellbore, and pumping through the well casing to the treatment site downhole.

One group of catalysts found to be useful in the present invention include a class of surfactant compounds having a strong acid functional group. It has been found that sulfonic acid functional groups attached to a hydrophobic groups, such as a long chain alkyl, aryl, or alkylaryl groups, are especially useful. In one embodiment of the present invention suitable catalysts include alkyl benzene sulfonic acids in which the alkyl group contains from 9 to 15 carbon atoms. Although the preferred position of the alkyl group on the benzene ring is para to the sulfonic acid group, meta and ortho isomers or a mixture of isomers may be useful. The preferred structural isomer of the alkyl group is that of a straight chain alkyl, however isomers in which the alkyl group is branched may also be useful in the practice of the present invention. Thus in one embodiment a suitable catalyst is selected from the group including nonylbenzene sulfonic acid, decylbenzene sulfonic acid, undecylbenzene sulfonic acid, dodecylbenzene sulfonic acid, tridecylbenzene sulfonic acid, tetradecylbezene sulfonic acid, pentadecyl sulfonic acid, and mixtures thereof. And in a third embodiment the catalyst is dodecyl benzene sulfonic acid.

The exact amount of catalyst utilized in any particular formulation will vary depending on the temperature of the subterranean formation and the desired resin curing time. When utilizing the polymerizable resin compositions of the present invention in the treatment of subterranean formations to control loose particles or to control water production, the temperature of the formation being treated will essentially be the same as the resin curing temperature. It has been found that if the treatment process is to be successful, the uncured polymerizable resin composition should penetrate the subterranean formation and at least partially cure preferably within about 1 to about 2 hours. However it is just as important that the polymerizable resin composition not prematurely cure in the well string or during the handling on the surface. Thus, the temperature of the subterranean formation needs to be known or measured as this will be approximately the same as the resin curing temperature.

One skilled in the art should be able to determine the percent weight of a dodecyl benzene sulfonic acid (DBSA) catalyst used in the formulation of a polymerizable resin composition by predetermining the resin curing temperature and then systematically increasing the amount added so as to achieve the desired curing time. As noted above this curing time is preferably within a range of about 1 to about 2 hours.

As a practical matter and to speed the dissolution of the catalyst in the furfuryl alcohol resin the catalyst may be dissolved in a minimal amount of $C_1$ to $C_6$ alkyl alcohol or $C_3$ to $C_8$ alkyl acetate before mixing with the furfuryl alcohol resin. In one embodiment a methanol solution saturated with the catalyst serves this purpose. In another embodiment a saturated solution of catalyst in butyl acetate is used. In a third a mixture of organic diluents is used, the organic diluents being selected from the group including $C_3$ to $C_8$ alkyl esters, $C_1$ to $C_6$ alkyl alcohols; halogenated aromatics and mixtures thereof.

Both polymer and water are generated in the acid catalyzed polymerization reaction of furfuryl alcohol resin as shown in Equation 1.

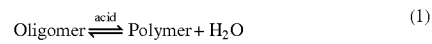

$$\text{Oligomer} \underset{}{\overset{acid}{\rightleftharpoons}} \text{Polymer} + H_2O \qquad (1)$$

Eventhough the forward reaction which produces polymer and water is favored, the polymerization reaction will reach a chemical equilibrium and proceed no further. In order to achieve a highly polymerized resin product, water should be removed from the system thereby driving the reaction to the right and thus forming a more highly polymerized resin. One way of removing the by-product water is to include an organic diluent which is readily hydrolyzed under the conditions encountered downhole. In one embodiment the hydrolysis reaction of an ester is utilized in which the formation of the corresponding alcohol and carboxylic acid are highly favored as shown in Equation 2.

$$RCOOR' + H_2O \xrightarrow{acid} RCOOH + HOR' \qquad (2)$$

By combining the polymerization reaction with the hydrolysis reaction, a high degree of polymerization is achieved. Thus in one embodiment an ester is selected so that upon inclusion with the furfuryl resin, the ester serves not only as a diluent and solvating agent for the resin, but also hydrolyzes under the conditions suitable for the auto-polymerization reaction of the furfuryl resin. In one embodiment the ester is a $C_3$ to $C_9$ alkyl ester. In another embodiment the ester is a $C_1$ to $C_6$ alkyl acetate. And in a third embodiment the ester is butyl acetate.

As an alternative embodiment, the polymerizable resin compositions described herein may also include so called "super-slurper" polymers. As the term is used herein, super-slurper polymers are polymers that function so as to minimize the shrinkage or expansion of the cured polymerized resin compositions described above. In one embodiment, super-slurper polymers may be selected from the group including copolymers of starch and acrylamides or starch and acrylates. Unlike the acid catalyst utilized in the prior art, the acid catalysts of the present invention are not adversely affected by the inclusion of super-slurper polymers into the polymerizable resin compositions described herein. As previously noted, when p-toluene sulfonic acid is used as the acid catalyst, the polymerization time becomes unpredictable at all temperatures. This is believe to be due to the interaction or absorption of the acid catalyst by the super-slurper polymers. However, by utilizing the acid catalysts of the present invention in the formulation of polymerizable resin compositions containing super-slurper polymer, the polymerization time is essentially unchanged for a wide range of temperatures, that is so say from about 15° C. (60 F.°) to about 260° C. (500 F.°).

In yet another alternative embodiment, the polymerizable resin compositions described herein may included solid particles. The solid particles may be mixed with the polymerizable resin compositions so as to coat the solid particles prior to use in the well or the solid particles may be coated with the polymerizable resin compositions after they have been introduced into the well. Such coated particles may be use in a gravel packing or similar such applications which should be apparent to one of ordinary skill in the art. The solid particles may also serve as filler material used to reduce the volume of polymerizable resin composition used in the plugging and abandonment of a well. Suitable solid particles include sand, silica, glass beads, barite, coconut shell or hull, wood chips, wood saw dust and mixtures thereof. One of the benefits of the polymerizable resin compositions disclosed herein is that the inclusion of such solid particles has a minimal effect on the amount of acid catalyst used in the formulation so as to achieve a predictable polymerization time for any given temperature. This is in contrast to unpredictable nature of the polymerization time in polymerizable resin compositions utilizing the acid catalysts of the prior art, such as p-toluene sulfonic acid, especially when woody or fibrous or other absorbing filler materials are used.

Another aspect of the present invention is a method of consolidating particles in a subterranean formation penetrated by a well and being in fluid communication with the subterranean formation. Generally, the method includes introducing the formulated polymerizable resin described above into the subterranean formation and allowing the polymerizable resin composition to at least partially polymerize so as to form a consolidated mass of particles around the well.

If a porous consolidated mass of particles is desired, the method may further include flushing an aqueous salt solution into the subterranean formation prior to allowing the polymerizable resin to at least partially polymerize. As used herein this flushing with an aqueous salt solution is referred to as a "post-flush". The purpose of post-flushing is to coat the mineral particles with polymerizable resin composition so that upon polymerization a fluid permeable consolidated mass of mineral particles is formed in the subterranean formation around the well.

An alternative embodiment of the present aspect of the present invention includes determining the temperature of the subterranean formation and formulating a polymerizable resin composition with sufficient acid catalyst so that the polymerizable resin composition will polymerize in a predictable time period. This sub-embodiment further includes introducing the polymerizable composition into the well bore and pumping the polymerizable resin composition down hole and into a subterranean formation wherein at least partial polymerization of the polymerizable resin composition takes place thus forming a consolidated mass about the well. If a fluid permeable consolidated mass of particles is desired, then prior to allowing the polymerizable resin composition to at least partially polymerize an aqueous salt solution is pumped downhole and flushed through the resin saturated area of the subterranean formation. As noted above, this post flushing coats the unconsolidated mineral particles with the polymerizable resin composition which upon polymerization forms a fluid permeable consolidated mass of mineral particles in the subterranean formation around the well.

In a third alternative embodiment of the present method, solid particles may be coated on the surface with the polymerizable resin composition disclosed above and subsequently delivered downhole. In one such embodiment gravel or glass beads are coated with a polymerizable resin composition formulated so as to contain a suitable amount of acid catalyst. The resin coated gravel or glass beads are introduced into the well and pumped downhole and into the subterranean formation and the polymerizable resin composition is allowed to at least partially polymerize thus forming a consolidated mass of particles in the subterranean formation around the well. If a fluid permeable mass is desired downhole, post flushing with an aqueous salt solution is carried out prior to the polymerization of the polymerizable resin composition. This subembodiment should be recognized by one of ordinary skill in the art as "gravel packing" the well.

Yet another embodiment of the present method is possible when a well is to be plugged in preparation for abandonment. In one such alternative embodiment super-slurper polymers are mixed into the polymerizable resin composition as is described above. The polymerizable resin composition is then introduced into the wellbore and pumped downhole to the vertical location in the well where the plug is desired. The vertical location of the plug in the well is determined by using conventional plugging methods and equipment which should be well known to one of ordinary skill in the art. The polymerizable resin composition is allowed to at least partially polymerize there by forming a solid thermoplastic resin plug which effectively seals the well. In some wells a single plug is all that is needed. In other wells a plurality of such plugs may be used to isolate different subterranean formations. In another such alternative embodiment a filler material is mixed with the polymerizable resin composition just prior to introducing the polymerizable resin composition into the well. Examples of such filler materials include, gravel and rocks, coconut shells and hulls, wood chips, wood saw dust or any other inexpensive material that is suitable. The role of such filler materials is to reduce the amount of polymerizable resin composition that is needed to fill and effectively plug the well.

The following examples are included to demonstrate illustrative embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLE 1

Polymerizable resin compositions with either 2% or 4% weight of dodecyl benzene sulfonic acid (DBSA) were prepared by mixing measured amounts of DBSA into a mixture of about 80 parts by weight furfuryl alcohol resin and about 20 parts by weight butyl acetate. A sufficient amount of the resulting homogeneous mixtures were poured into disposable syringes, typically 5 ml in volume, packed with about 2.6 cm (1 inch) of 20–40 mesh Ottawa sand so as to saturate the sand with resin. If a fluid permeable sample was desired, the resin coated sand was post-flushed with a saturated aqueous sodium chloride solution. Typically the volume of the post-flush aqueous solution was about three time the volume of the syringe use (i.e. 15 ml). The samples were then placed in an oven at 93° C. (200° F.) until hard.

The sample with 4% DBSA had a curing time of less than 1 hour while that of the sample with 2% DBSA had a curing time of about 2 hours. One skilled in the art should recognize and be able to empirically determine by routine experimentation the relationship between the amount of DBSA catalyst used and the curing temperature of the sample affect the set time of the resin.

EXAMPLE 2

A number of polymerizable resin compositions with various concentrations of dodecyl benzene sulfonic acid (DBSA) were prepared by mixing measured amounts of DBSA into a mixture of about 80 parts by weight furfuryl alcohol resin available from commercial sources and about 20 parts by weight butyl acetate. The amount of DBSA for any particular formulation is given below in Table 1. A sufficient amount of the resulting homogeneous mixtures were poured into disposable syringes, typically 5 ml in volume, packed with about 2.6 cm (1 inch) of 20–40 mesh Ottawa sand so as to saturate the sand with resin. If a fluid permeable sample was desired, the resin coated sand was post-flushed with a saturated aqueous sodium chloride solution. Typically the volume of the post-flush aqueous solution was about three time the volume of the syringe use (i.e. 15 ml). The samples were then placed in an oven at the temperatures noted below in Table 1 and the set time determined. A sample was consider to be hardened when pressing on the sample indicates no substantial deformation of the sample. A representative sample of sample temperature and approximate set time are given in Table 1:

TABLE 1

| Sample Number | Amount of DBSA* (% weight) | Temperature ° C. (F°) | Approximate Set Time (hours) |
|---|---|---|---|
| 1 | 4 | 27 (80) | 6–21 |
| 2 | 2 | 27 (80) | about 56 |
| 3 | 4 | 93 (200) | less than 1 |
| 4 | 2 | 93 (200) | 2 |
| 5 | 2.1 | 49 (120) | about 8 |
| 6 | 2.2 | 49 (120) | about 8 |
| 7 | 2.3 | 49 (120) | about 8 |

*DBSA = dodecyl benzene sulfonic acid

As should be apparent to one of ordinary skill in the art in view of the above data, the amount of DBSA catalyst used and the curing temperature of the sample affect the set time of the resin. Further one of ordinary skill in the art should be able to use the above example to vary the amount of catalyst present in the resin composition and determine the set time at a predetermined temperature. Thus a matrix of values for cure time, curing temperature and amount of catalyst can be created an used to vary the formulation of the resin composition to suit the application desired.

EXAMPLE 3

In the present example the use of dodecyl benzene sulfonic acid as the polymerization catalyst is compared with toluene sulfonic acid.

A polymerizable resin composition utilizing dodecyl benzene sulfonic acid as the polymerization catalyst was prepared by mixing 80 parts by weight of the furfuryl alcohol resin utilized in Example 1 and 20 parts by weight of butyl acetate into which 2% by weight of dodecyl benzene sulfonic acid was added as the catalyst. This polymerizable resin composition is referred to below as polymerizable resin composition A.

A polymerizable resin composition utilizing p-toluene sulfonic acid as the polymerization catalyst was prepared by mixing 80 parts by weight of the furfuryl alcohol resin with 20 parts by weight of butyl acetate into which 2% by weight of p-toluene sulfonic acid was added as the polymerization catalyst. This polymerizable resin composition is referred to below as resin composition B.

Either resin composition A or resin composition B was used prepare sand packs for comparative testing of compressive strength as described below.

Preparation of Compressive Strength Test Samples: A disposable plastic syringe (5 ml) was filled with 20–40 Ottawa Sand so as to contain at least about 2.6 cm (1 inch) of sand. Sufficient amounts of the freshly prepared polymerizable resin composition was poured into the syringe containing the sand so as to saturate the sand. If the sand pack is to be at least partially permeable to fluids a saturated aqueous solution of sodium chloride is post-flushed through the resin/sand containing syringe. Typically the volume of solution used to post flush the resin is at least three times that of the capacity of the syringe. The resin/sand containing syringe is hardened in an oven held at about 65° C. (150° F.) overnight. The test sample is readily removed from the syringe upon cooling and is used to determine compressive strength.

Compressive Strength Test: An adequately shielded press that has a scale to determine the applied pressure may be used. In the present example a hydraulic press was used. The pressure at which the test sample begins to exhibits cracking is considered the compressive strength of the sample. The compressive strength of a test samples made with resin composition A were measured in relation to the compressive strength of test samples made with resin composition B. It was found that the samples using resin composition A had higher compressive strengths that the samples using resin composition B. In addition upon microscopic examination of the sand particles it was observed that the sand particles were more uniformly coated with resin containing DBSA as a catalyst than were the sand particles coated with the resin using TSA as the catalyst.

In view of the above, one of ordinary skill in the art should understand that one illustrative embodiment of the present invention includes a polymerizable resin composition including a furfuryl alcohol oligomer resin and a polymerization catalyst. The catalyst should be a $C_9$ to $C_{15}$ alkyl benzene sulfonic acid and preferably the alkyl benzene sulfonic acid is dodecyl benzene sulfonic acid. The polymerizable resin composition may further include an organic diluent selected from $C_3$ to $C_8$ alkyl esters, $C_1$ to $C_6$ alkyl alcohols; halogenated aromatics and mixtures thereof. Preferably the organic diluent is a $C_1$ to $C_6$ alkyl acetate and more preferably the $C_1$ to $C_6$ alkyl acetate is butyl acetate. The illustrative polymerizable resin composition may also include a super-slurper polymer, for example polymers selected from copolymers of starch and acrylamides or starch and acrylates. In addition, solid particles may be included into the illustrative polymerizable resin. Such solid particles may be selected from sand, silica, gravel, glass beads, barite, coconut shell or hull, wood chips, wood saw dust, similar such inert filler materials and mixtures thereof. When the solid particles are sand and upon at least partial polymerization of the polymerizable resin composition a consolidated mass of sand particles should form in which the consolidated mass has a compressive strength that is at least 50% greater than a similar consolidated mass made using p-toluene sulfonic acid as the polymerization catalyst. One of skill in the art should appreciate that the consolidated mass of sand particles may be made to be at least partially permeable to fluids, such as water, oil or other production fluids by the use of a "post-flush" fluid. At least partial polymerization of the resin should take place at a temperature from 15° C. (60 F.°) to 260° C. (500 F.°) and preferably such polymerization should occur in about 1 to about 2 hours. As previously noted, the temperature and the time for polymerization are function of the amount of catalyst present in the resin formulation. Upon the determination of one, for example time, the amount of catalyst utilized depends as a function of the temperature. The determination of the exact amount of catalyst utilized thus may be made by fixing either time or temperature and systematically varying the amount of catalyst used until the desired result is achieved.

Another illustrative embodiment of the present invention includes a polymerizable resin composition for use downhole in a subterranean well. Such an illustrative resin composition should include a furfuryl alcohol oligomer resin, an organic diluent and a $C_9$ to $C_{15}$ alkyl benzene sulfonic acid. In one preferred embodiment, the organic diluent is a $C_1$ to $C_6$ alkyl acetate and the alkyl benzene sulfonic acid is dodecyl benzene sulfonic acid. The polymerizable resin composition should be formulated so that at least partial polymerization of the resin composition occurs at a temperature from about 15° C. (60 F.°) to about 260° C. (500 F.°). In one illustrative embodiment, the amount of furfuryl resin is from 40 to 90 percent weight, the amount of the organic diluent is from 5 to 60 percent weight and the amount of the $C_9$ to $C_{15}$ alkyl benzene sulfonic acid is from 0.01 to 5 percent weight. The polymerization resin may also include solid particles such as sand, silica, gravel, glass beads, barite, coconut shell or hull, wood chips, wood saw dust and mixtures thereof. When the solid particles are sand the resin should be formulated so that upon at least partial polymerization a permeable consolidated mass of solid particles forms. This permeable consolidated mass should be at least partially permeable to fluids and have a compressive strength that is at least 50% greater than a similar consolidated mass made using p-toluene sulfonic acid as the polymerization catalyst.

A person of ordinary skill in the art should also appreciate that the present invention includes the use of the present invention in a method for consolidating the formation area surrounding the downhole producing zone of an oil or gas well. Such an illustrative method would include a method for consolidating particles in a subterranean formation penetrated by a well in which the well is in fluid communication with at least a portion of the subterranean formation. Such an illustrative method may include: introducing a polymerizable resin composition into the subterranean formation and allowing the polymerizable resin composition to at least partially polymerize thus forming a consolidated mass of particles around the well. The polymerizable resin composition should include a furfuryl alcohol oligomer resin and a polymerization catalyst, the catalyst preferably being a $C_9$ to $C_{15}$ alkyl benzene sulfonic acid and more preferably the catalyst is dodecyl benzene sulfonic acid. In one illustrative embodiment the polymerizable resin composition further includes an organic diluent preferably selected from $C_3$ to $C_8$ alkyl esters, $C_1$ to $C_6$ alkyl alcohols; halogenated aromatics and mixtures of these compounds. Preferably the organic diluent is a $C_1$ to $C_6$ alkyl acetate and more preferably the organic diluent is butyl acetate. The illustrative polymerizable resin composition may also include a super-slurper polymer. Such super-slurper polymers may be copolymers of starch and acrylamides or starch and acrylates or any other similar such polymer that absorbs water. Solid particles may also be included in the illustrative polymerizable resin composition and preferably such solids are selected from sand, silica, gravel, glass beads, barite, coconut shell or hull, wood chips, wood saw dust and mixtures of these solids. The mixture of components in the illustrative resin should preferably include furfuryl resin in an amount from about 40 to about 90 percent weight, organic diluent in an amount from about 5 to about 60 percent weight and $C_9$ to $C_{15}$ alkyl benzene sulfonic acid in an amount from about 0.01 to about 5 percent weight. The illustrative method may further include flushing an aqueous salt solution into the subterranean formation prior to allowing the polymerizable resin composition to at least partially polymerize thus forming a consolidated mass of particles around the well that is at least partially permeable to fluids. The inclusion of the flushing step should preferably result in a consolidated mass that is at least partially permeable to fluids has a compressive strength that is at least 50% greater than a similar consolidated mass made using p-toluene sulfonic acid as the polymerization catalyst.

While the compositions and methods of this invention have been described in terms of preferred embodiments, it will be apparent to those of skill in the art that variations may be applied to the process described herein without departing from the concept and scope of the invention. All such similar substitutes and modifications apparent to those skilled in the art are considered to be within the concept and scope of this invention as defined by the following claims.

What is claimed is:

1. A method for consolidating particles in a subterranean formation penetrated by a well, the well being in fluid communication with at least a portion of the subterranean formation comprising:

introducing a polymerizable resin composition into the subterranean formation, the polymerizable resin composition including a furfuryl alcohol oligomer resin and a polymerization catalyst, the catalyst being a $C_9$ to $C_{15}$ alkyl benzene sulfonic acid, and allowing the polymerizable resin composition to at least partially polymerize thus forming a consolidated mass of particles around the well.

2. The method of claim 1 wherein the alkyl benzene sulfonic acid is dodecyl benzene sulfonic acid.

3. The method of claim 1 wherein the polymerizable resin composition further includes an organic diluent selected from the group consisting of $C_3$ to $C_8$ alkyl esters, $C_1$ to $C_6$ alkyl alcohols; halogenated aromatics and mixtures thereof.

4. The method of claim 3 wherein the organic diluent is a $C_1$ to $C_6$ alkyl acetate.

5. The method of claim 4 wherein the $C_1$ to $C_6$ alkyl acetate is butyl acetate.

6. The method of claim 3 wherein the polymerizable resin composition further includes a super-slurper polymer selected from the group consisting of copolymers of starch and acrylamides or starch and acrylates.

7. The method of claim 3 wherein the solid particles are selected from the group consisting of sand, silica, gravel, glass beads, barite, coconut shell or hull, wood chips, wood saw dust and mixtures thereof.

8. The method of claim 1 further comprising flushing an aqueous salt solution into the subterranean formation prior to allowing the polymerizable resin composition to at least partially polymerize thus forming a consolidated mass of particles around the well that is at least partially permeable to fluids.

9. The method of claim 8 wherein the consolidated mass that is at least partially permeable to fluids has a compressive strength that is at least 50% greater than a similar consolidated mass made using p-toluene sulfonic acid as the polymerization catalyst.

10. The method of claim 1 wherein the subterranean formation has a temperature from 15° C. (60 F.°) to 260° C. (500 F.°).

11. The method of claim 3 wherein the amount of furfuryl resin is from 40 to 90 percent weight, the amount of the organic diluent is from 5 to 60 percent weight and the amount of the $C_9$ to $C_{15}$ alkyl benzene sulfonic acid is from 0.01 to 5 percent weight.

12. A polymerizable resin composition for use downhole in a well comprising a furfuryl alcohol oligomer resin, a $C_3$ to $C_8$ alkyl ester and a $C_9$ to $C_{15}$ alkyl benzene sulfonic acid polymerization catalyst.

13. The polymerizable resin composition recited in claim 12 wherein the organic diluent includes a $C_1$ to $C_6$ alkyl acetate and the alkyl benzene sulfonic acid is dodecyl benzene sulfonic acid.

14. The polymerizable resin composition recited in claim 13 wherein at least partial polymerization of the resin composition occurs at a temperature from 15° C. (60 F.°) to 260° C. (500 F.°).

15. The polymerization resin recited in claim 14 further comprising solid particles, the solid particles being selected from the group consisting of sand, silica, gravel, glass beads, barite, coconut shell or hull, wood chips, wood saw dust and mixtures thereof.

16. The polymerizable resin composition recited in claim 15 wherein the solid particles are sand and upon at least partial polymerization a permeable consolidated mass of solid particles forms that is at least partially permeable to fluids, the permeable consolidated mass having a compressive strength that is at least 50% greater than a similar consolidated mass made using p-toluene sulfonic acid as the polymerization catalyst.

17. The polymerizable resin composition of claim 12 wherein the amount of furfuryl resin is from 40 to 90 percent weight, the amount of the organic diluent is from 5 to 60 percent weight and the amount of the $C_9$ to $C_{15}$ alkyl benzene sulfonic acid is from 0.01 to 5 percent weight.

18. The polymerizable resin composition of claim 17 wherein the organic diluent is a $C_1$ to $C_6$ alkyl acetate and the alkyl benzene sulfonic acid is dodecyl benzene sulfonic acid.

* * * * *